United States Patent [19]

Ostrowski et al.

[11] 4,110,150
[45] Aug. 29, 1978

[54] APPARATUS FOR JOINING FUSIBLE ELEMENTS

[75] Inventors: Richard C. Ostrowski; John Styfhoorn, both of Dunlap, Ill.

[73] Assignee: Caterpillar Tractor Co., Peoria, Ill.

[21] Appl. No.: 800,507

[22] Filed: May 25, 1977

[51] Int. Cl.² ............................................. B32B 31/00
[52] U.S. Cl. ............................................................ 156/499
[58] Field of Search ............................ 156/499, 359, 380

[56] References Cited

U.S. PATENT DOCUMENTS

| | | | |
|---|---|---|---|
| 2,384,014 | 9/1945 | Cutter | 156/499 |
| 2,972,371 | 2/1961 | Hermann et al. | 156/499 |
| 3,879,254 | 4/1975 | Hay | 156/499 |
| 3,893,881 | 7/1975 | Gerber et al. | 156/250 |
| 3,897,296 | 7/1975 | Waldrum | 156/499 |

*Primary Examiner*—Douglas J. Drummond
*Attorney, Agent, or Firm*—John L. James

[57] ABSTRACT

An apparatus is provided for joining first and second fusible elements. The apparatus includes apparatus for controllably heating the first element to a temperature sufficient for forming a bond with the second element and apparatus for controllably moving the heating apparatus relative to the first element.

4 Claims, 5 Drawing Figures

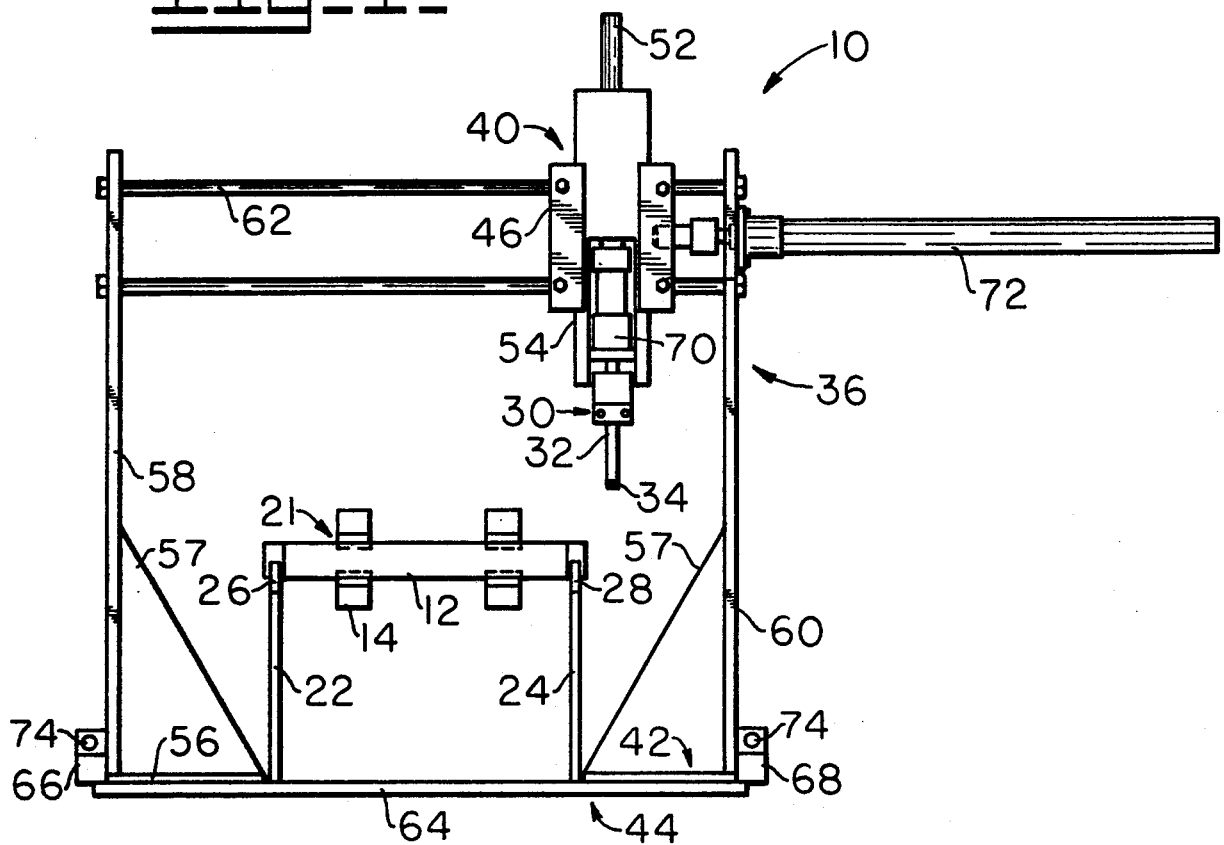
Fig-1-
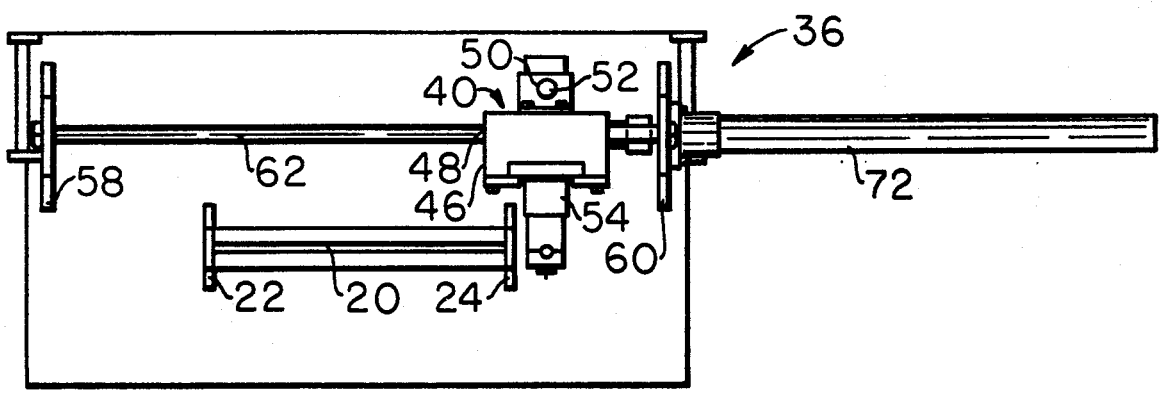
Fig-2-

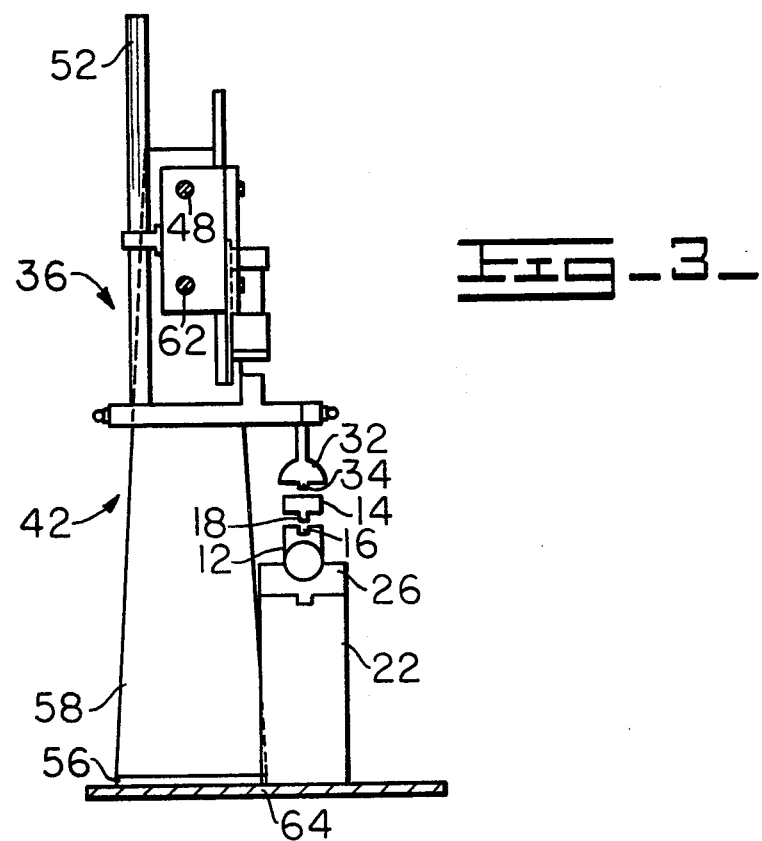
Fig-3-
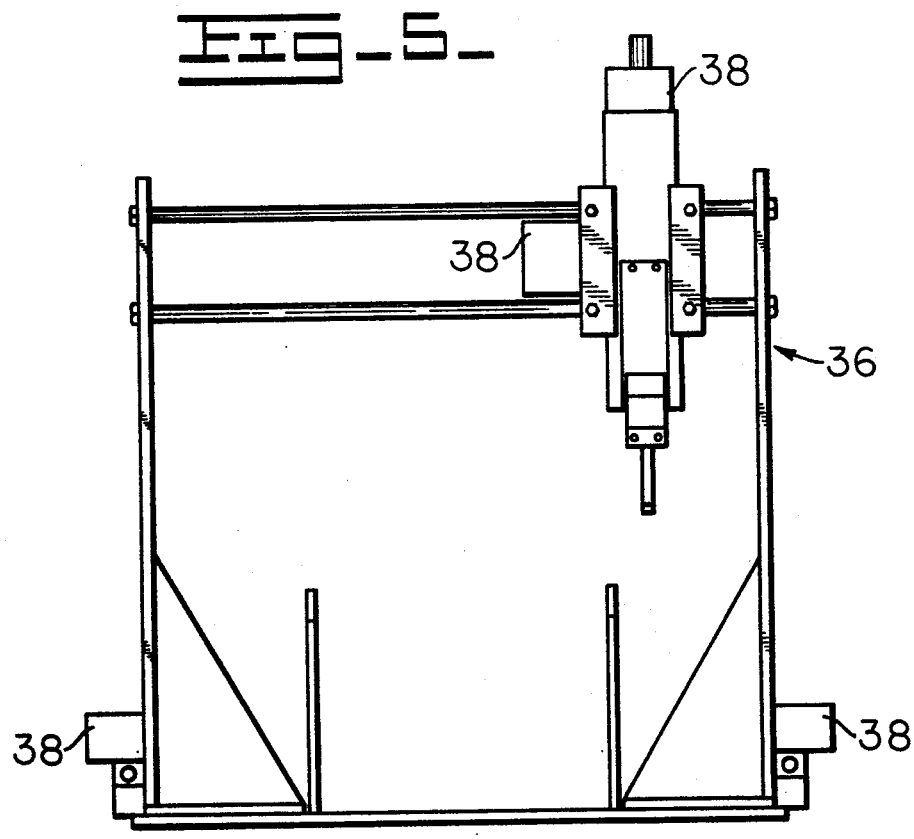
Fig-5-

Fig. 4.
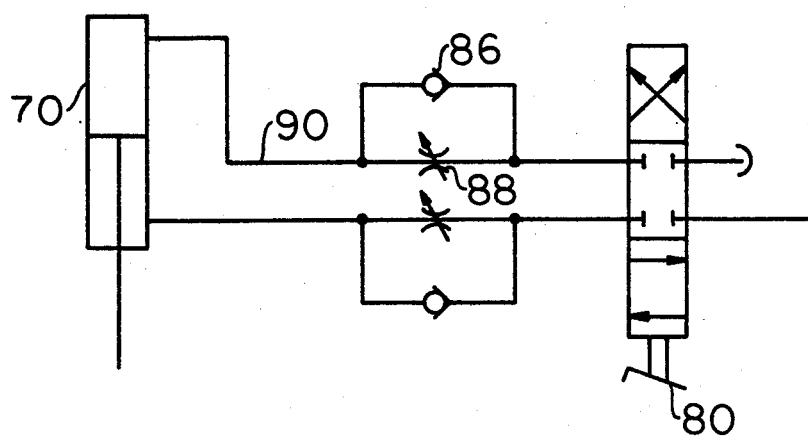
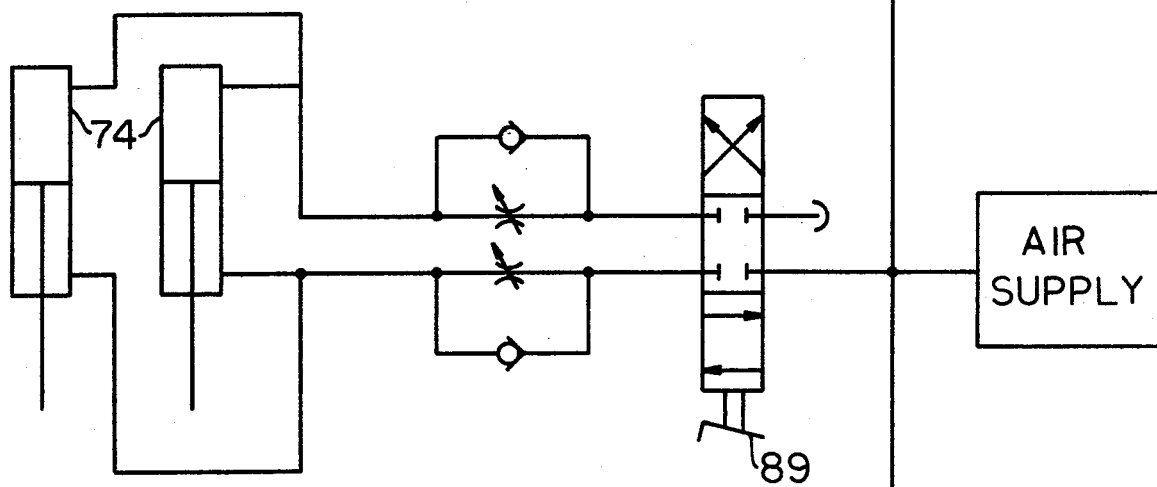
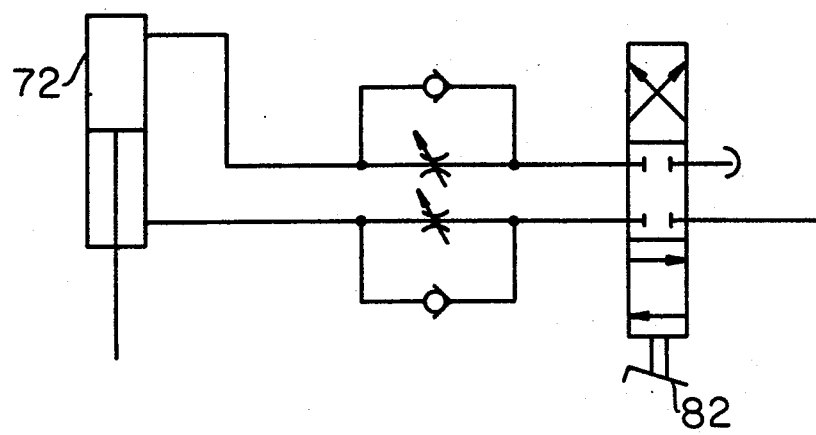

APPARATUS FOR JOINING FUSIBLE ELEMENTS

BACKGROUND OF THE INVENTION

Machine parts are often made by investment casting in which molten metal is cast in ceramic molds. The ceramic molds are made by coating wax models of the finished parts and melting the wax to leave the mold. These wax models are sometimes small and several are grouped on a wax support to save space. The wax models are dipped in melted wax and are joined to the support by hand. Sometimes a joint has air pockets or other cavities which are thereafter eliminated by melting the wax in the joint manually with a soldering iron. This is a time consuming operation but it must be done to prevent imperfect finished machine parts which cannot be used. Time spent in wax welding with a soldering iron and reworking imperfect joints and parts is a very large portion of the total time required to produce the machine parts. It is desirable to obtain a joint which is acceptable without manually soldering with a hand held soldering iron. It is desirable to join the wax models to the support in an efficient manner.

SUMMARY OF THE INVENTION

The present invention is directed to overcoming one or more of the problems as set forth above.

According to the present invention, apparatus is provided for joining first and second fusible elements. The apparatus includes apparatus for controllably heating the first element to a temperature sufficient for forming a bond with the second element. The apparatus also includes apparatus for controllably moving the heating apparatus along the first element in a preselected pathway.

BRIEF DESCRIPTION OF THE DRAWINGS

FIG. 1 is a front view of the present invention;
FIG. 2 is a plan view of the invention;
FIG. 3 is a left side view of the invention;
FIG. 4 is a schematic diagram of the pneumatic controls; and
FIG. 5 is a front view similar to FIG. 1 but showing electrical controls.

DETAILED DESCRIPTION

Referring to FIG. 1, apparatus 10 is provided for joining first and second fusible elements 12, 14, such as first and second wax elements, for example. The first element 12 preferably has a groove 16 and the second element preferably has a tongue 18 mateable with the groove 16 (FIG. 3). Other arrangements such as holes and mateable dowels are used where appropriate to mount the second element 14 on the first element 12. The groove 16 or holes form a pathway 20 along which the elements 12, 14 are joined to form a unitary structure 21. The first element 12 is supported by a pair of generally upright support members 22, 24 each having removably mounted end portions 26, 28 respectively. The end portions 26, 28 have a size and configuration sufficient for supporting the first element 12.

The apparatus includes means for controllably heating selected portions of the first element 12, such as a heating element 30, and means for controllably moving the heating element 30 along the pathway 20. The heating element 30 is electromagnetically heated, preferably by current flow through the heating element 30, and heats first element 12 to a temperature sufficient for melting the first element 12 and subsequently forming a bond with the second element 14. The heating element 30 has a tip 32 which is preferably removably mounted, and is of a size and configuration sufficient for heating selected portions of the first element 12. For example, the tip 32 would have a tongue 34 to extend into the groove 16 of the first element 12.

Referring to FIGS. 1-3, the moving means includes a support assembly 36 so constructed and arranged that the heating element 30 is supported by the support assembly 36 and movable in three mutually generally perpendicular planes. The heating element 30 is preferably moved by electric stepping motors 38 (FIG. 5), but other motors, such as pneumatic or hydraulic motors for example, can be used. The heating element 30 is movable along the pathway 20 at a preselected attitude relative to the first element 12. It should be understood that the pathway of movement can be other than linear and the attitude can be in contact with the first element 12, spaced a preselected distance from said first element 12 or a combination thereof for melting, for example, spaced preselected portions of said first element 12.

Referring to FIGS. 1-3 and 5, the moving means includes first, second, and third support assemblies 40, 42, 44. The first assembly 40 is connected to the heating element 30 and moves the heating element 30 generally vertically to a preselected attitude relative to the first element 12. The first assembly 40 includes a base 46 having generally horizontal and vertical openings 48, 50 therein, an elongated generally upright member 52 and a bracket 54. The elongated member 52 is movably mounted on the base 40 and the bracket 54 which holds the heating element 30 is mounted on the elongated member 52.

The second support assembly 42 is movably connected to the first support assembly 40 and moves the heating element 30 generally laterally in substantially a straight path, east-west for example. The second assembly 42 includes a base plate 56 and braces 57 which support a pair of spaced-apart, generally upright supports 58, 60 and one or more, preferably two, elongated cross members 62 connected to the upright supports 58, 60 in opposed relation to the base plate 56. The cross members 62 are disposed in the horizontal openings 48 of the base 46 to the first assembly 40. The first assembly 40 moves along the cross members 62.

The third support assembly 44 is movably connected to the second support assembly 42 and moves the heating element 30 generally laterally in substantially a straight path, north-south for example, which is generally perpendicular to the path of the first and second assemblies 40, 42. The third assembly 44 includes a base plate 64 which supports a pair of spacedapart elongated members 66, 68. The second assembly 42 rides on the base plate 64 between the elongated members 66, 68.

Referring to FIGS. 1 and 2, pneumatic motors, such as double acting air cylinders 70, 72 and 74, are conveniently mounted on the support assembly 36 and control the movement of the first, second and third assemblies 40, 42 and 44.

Referring to FIG. 4, each of the air cylinders 70, 72 and 74 are controllably connected to an air supply 76 by levers 80, 82 and 84, respectively. The air cylinder 70 is equipped with a check valve 86 and a gauge 88 for each air line 90 for measuring speed or pressure. The other cylinders 72, 74 are similarly equipped. The check valve 86 allows air flow in a preselected direction when the lever 80 is operated by hand or preferably by foot.

Referring to FIG. 5, the air cylinders 70, 72 and 74 are replaced by the preferred electric stepping motor 38. The electric stepping motor 38 is preferred since it more precisely controls movement and it is readily adaptable for use with automatic control systems. The support assembly 36 can have notched surfaces wherein the notches are compatible with individual steps of the stepping motor 38.

In operation, the heating element 30 is passed along the preselected pathway 20 at a preselected attitude relative to the first element 12. The rate of movement is controlled by the stepping motors 38 so that preselected portions of the first element 12 are melted. Selected portions of the second element 14 can be dipped in melted wax and urged against the first element 14 at a preselected location while selected portions of each element 12, 14 are in a fluid condition. This forms a unitary structure 21 which is substantially free of voids between the first and second elements. An operator can control the rate of movement with his feet while leaving his hands free to urge the elements 12, 14 together. The preselected pathway can also be controlled to provide an infinite number of melted portions of an infinite number of different configurations and locations.

Other aspects, objects and advantages will become apparent from a study of the specification, drawings and appended claims.

The embodiments of the invention in which an exclusive property or privilege is claimed are defined as follows:

1. Apparatus for joining a first fusable element defining a preselected pathway and a second fusable element along the pathway, comprising:
    first means for supporting the first fusable element;
    means for controllably heating selected portions of said first element about the pathway to a temperature sufficient for forming a bond with said second element;
    second means for supporting the heating means, said second support means including a first support assembly, said heating means being connected to and movable along said first assembly in a first direction; a second support assembly connected to said first assembly, said first assembly being movable along said second assembly in a second direction, said heating means moving with said first assembly in said second direction, said second direction being substantialy perpendicular to said first direction; and a third support assembly connected to said second assembly, said second assembly being movable along the third assembly in a third direction, said first and second assemblies being movable relative to said third assembly in the third direction, said heating means moving with said first and second assemblies in said third direction, said third direction being substantially perpendicular to said first and second directions;
    first motor means for moving the heating means along the first assembly in the first direction;
    second motor means for moving the first assembly and the heating means therewith in the second direction; and
    third motor means for moving the second assembly and the first assembly and heating means therewith in the third direction.

2. An apparatus, as set forth in claim 1, wherein the first assembly includes
    a base;
    an elongated member mounted on said base and movable thereon in the first direction; and
    a bracket having a construction sufficient for holding the heating means and being mounted on said elongated member and movable therewith in the first direction.

3. An apparatus, as set forth in claim 1, wherein the second assembly includes
    a base plate;
    a pair of generally upright spaced apart members connected to said base plate; and
    at least one elongated member connecting said upright members said first assembly being connected to and movable along said elongated member in the second direction.

4. An apparatus, as set forth in claim 1, wherein the third assembly includes a pair of spaced apart members, and a member connecting said spaced apart members, said second assembly being positioned between the spaced apart member and movable therebetween in the third direction.

* * * * *